US012579684B2

(12) United States Patent
Danziger et al.

(10) Patent No.: US 12,579,684 B2
(45) Date of Patent: Mar. 17, 2026

(54) SYSTEM AND METHOD FOR POSE ESTIMATION OF SENSORS USING MOTION AND ANGULAR SHIFT

(71) Applicant: FORESIGHT AUTOMOTIVE LTD., Ness Ziona (IL)

(72) Inventors: Omri Danziger, Kfar Vradim (IL); Ivgeny Kopilevich, Rehovot (IL)

(73) Assignee: FORESIGHT AUTOMOTIVE LTD., Ness Ziona (IL)

( * ) Notice: Subject to any disclaimer, the term of this patent is extended or adjusted under 35 U.S.C. 154(b) by 452 days.

(21) Appl. No.: 18/021,797

(22) PCT Filed: Aug. 8, 2021

(86) PCT No.: PCT/IL2021/051011
§ 371 (c)(1),
(2) Date: Feb. 16, 2023

(87) PCT Pub. No.: WO2022/038609
PCT Pub. Date: Feb. 24, 2022

(65) Prior Publication Data
US 2023/0306633 A1      Sep. 28, 2023

Related U.S. Application Data

(60) Provisional application No. 63/066,840, filed on Aug. 18, 2020.

(51) Int. Cl.
*G06F 3/0346*        (2013.01)
*G06T 7/246*        (2017.01)
(Continued)

(52) U.S. Cl.
CPC ................ *G06T 7/74* (2017.01); *G06T 7/248* (2017.01); *G06T 17/00* (2013.01);
(Continued)

(58) Field of Classification Search
CPC ........... G06T 7/74; G06T 7/248; G06T 17/00; G06T 2207/20221; G06T 2207/30244;
(Continued)

(56) References Cited

U.S. PATENT DOCUMENTS

2018/0086284 A1      3/2018  Gupta et al.
2018/0315222 A1      11/2018  Jones
(Continued)

FOREIGN PATENT DOCUMENTS

EP          3017591 A1      5/2016

OTHER PUBLICATIONS

PCT International Search Report for International Application No. PCT/IL2021/051011, mailed Dec. 9, 2021, 4pp.
(Continued)

*Primary Examiner* — Thomas C Lee
*Assistant Examiner* — Michael V Farina
(74) *Attorney, Agent, or Firm* — The Roy Gross Law Firm, LLC; Roy D. Gross

(57) ABSTRACT

A method and system for of relative pose estimation between two or more sensors is disclosed. The system and method may include receiving a time frame, determine expected change in relative pose of at least two of the sensors, within the time frame and expected relations between angular directions of at least two of the sensors, calculating, by a processor, for each sensor a pose shift, calculating for each sensor the sensor's angular directions within the time frame, comparing relations between different sensors' angular directions, at each point in time, based on the expected relations between angular directions to determine a common direction of the two or more sensors, comparing common directions of the two or more sensors between different points in time based on the expected
(Continued)

change in relative pose, and estimating the relative pose between the two or more sensors based on the comparison.

17 Claims, 7 Drawing Sheets

(51) Int. Cl.

| | | |
|---|---|---|
| *G06T 7/70* | (2017.01) | |
| *G06T 7/73* | (2017.01) | |
| *G06T 17/00* | (2006.01) | |

(52) U.S. Cl.
CPC ............... *G06T 2207/20221* (2013.01); *G06T 2207/30244* (2013.01); *G06T 2207/30252* (2013.01)

(58) Field of Classification Search
CPC ............. G06T 2207/30252; G06T 7/70; G06F 3/0346
See application file for complete search history.

(56) References Cited

U.S. PATENT DOCUMENTS

| | | | |
|---|---|---|---|
| 2018/0365859 A1 | 12/2018 | Oba et al. | |
| 2019/0258251 A1 | 8/2019 | Ditty et al. | |
| 2020/0064483 A1* | 2/2020 | Li | G01S 13/867 |
| 2020/0160561 A1* | 5/2020 | Dai | G06V 20/588 |
| 2021/0024081 A1* | 1/2021 | Johnson-Roberson | G01S 17/89 |
| 2021/0201464 A1* | 7/2021 | Tariq | G06V 20/56 |
| 2021/0225012 A1* | 7/2021 | Devitt | G06T 7/248 |

OTHER PUBLICATIONS

PCT Written Opinion for International Application No. PCT/IL2021/051011, mailed Dec. 9, 2021, 5pp.

* cited by examiner

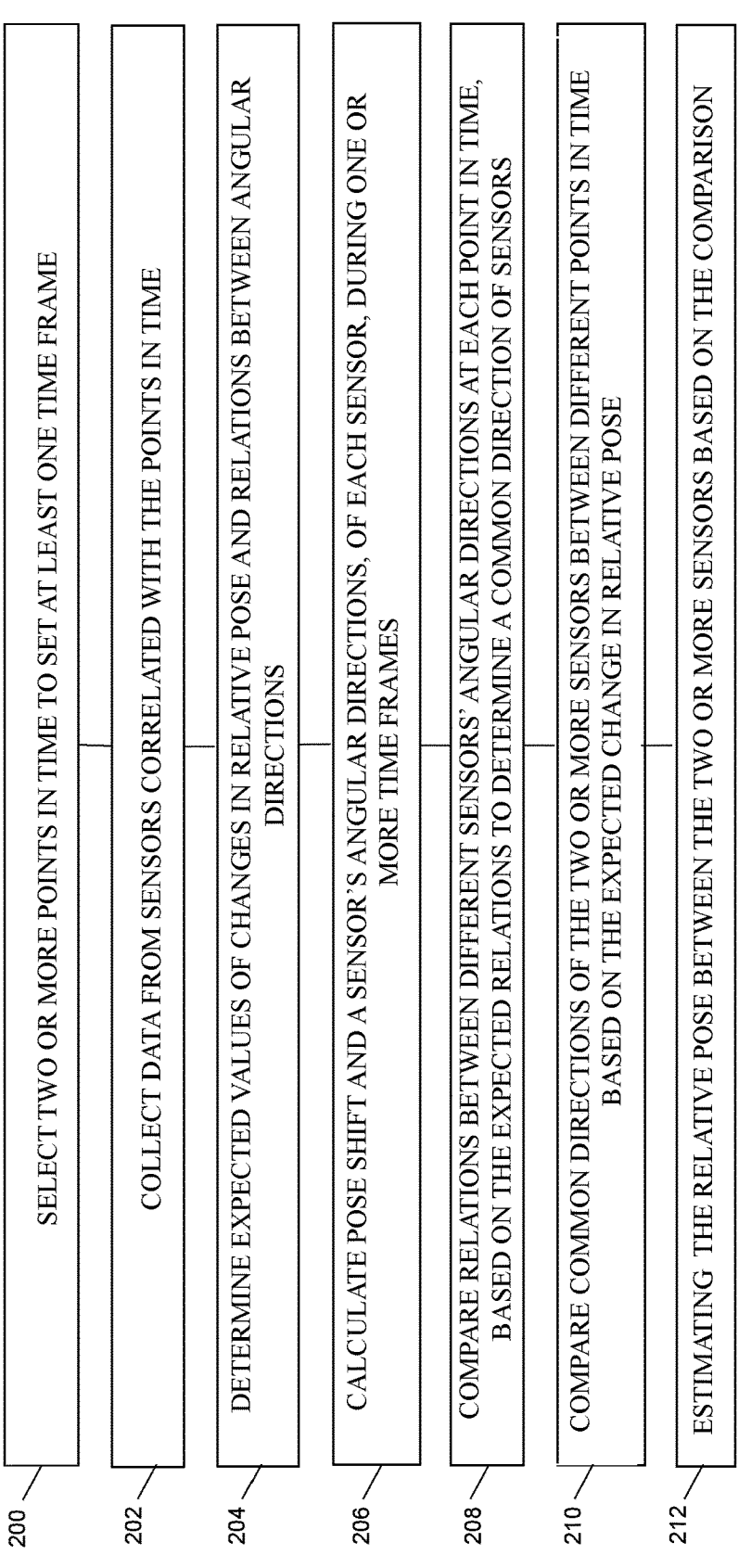

Fig. 2

200  SELECT TWO OR MORE POINTS IN TIME TO SET AT LEAST ONE TIME FRAME

202  COLLECT DATA FROM SENSORS CORRELATED WITH THE POINTS IN TIME

204  DETERMINE EXPECTED VALUES OF CHANGES IN RELATIVE POSE AND RELATIONS BETWEEN ANGULAR DIRECTIONS

206  CALCULATE POSE SHIFT AND A SENSOR'S ANGULAR DIRECTIONS, OF EACH SENSOR, DURING ONE OR MORE TIME FRAMES

208  COMPARE RELATIONS BETWEEN DIFFERENT SENSORS' ANGULAR DIRECTIONS AT EACH POINT IN TIME, BASED ON THE EXPECTED RELATIONS TO DETERMINE A COMMON DIRECTION OF SENSORS

210  COMPARE COMMON DIRECTIONS OF THE TWO OR MORE SENSORS BETWEEN DIFFERENT POINTS IN TIME BASED ON THE EXPECTED CHANGE IN RELATIVE POSE

212  ESTIMATING THE RELATIVE POSE BETWEEN THE TWO OR MORE SENSORS BASED ON THE COMPARISON

400 — RECEIVE SENSED DATA FRAMES FROM A SENSOR IN A PLURALITY OF TIME POINTS

402 — EXTRACT FEATURES FROM A FIRST OF THE PLURALITY OF DATA FRAMES RECEIVED

404 — TRACK FEATURES IN CONSECUTIVE DATA FRAMES RECEIVED FROM THE SAME SENSOR

406 — DETERMINE CHANGE IN POSE BASED ON TRACKED FEATURES LOCATION

500   ESTIMATE A RELARIVE POSE OF A PLURALITY OF SENSORS

502   CREATE A 3D RECONSTRACTION USING STERO DEPTH ESTIMATION ALGORITHM BASED ON THE ESTIMATED POSE

504   REGISTER THE STEREO DEPTH MAP TO ALL SENSORS

506   DETERMINE A LOCATION OF AN OBJECT WITH A KNOWN LOCATION IN ONE SENSOR'S FRAME IN ANOTHER SENSOR'S FRAME BASED ON THE REGISTRATION AND THE ESTIMATE POSE

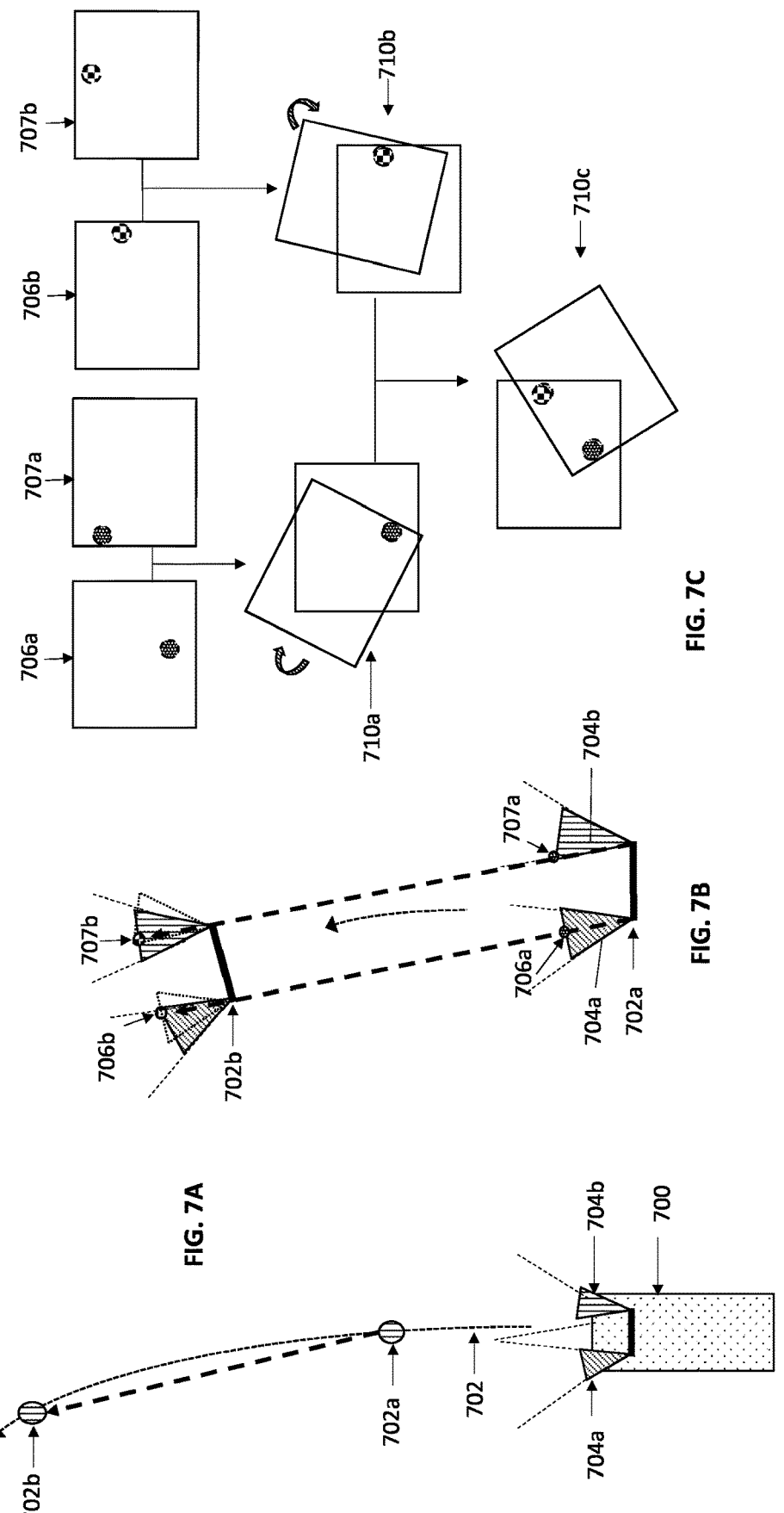

SYSTEM AND METHOD FOR POSE ESTIMATION OF SENSORS USING MOTION AND ANGULAR SHIFT

CROSS-REFERENCE TO RELATED APPLICATIONS

This application is a National Phase of PCT Patent Application No. PCT/IL2021/051011 having International filing date of Aug. 18, 2021, which claims the benefit of priority of U.S. Provisional Patent Application No. 63/066, 840, filed Aug. 18, 2020, and entitled: "POSE ESTIMATION OF SENSORS USING MOTION AND ANGULAR SHIFT", which are hereby incorporated by reference in its their entirety.

FIELD OF THE INVENTION

The present invention relates generally to pose estimation of sensors. More specifically, the present invention relates to using motion and angular shift of sensors for the estimation of sensors relative pose.

BACKGROUND

For accurate world representation systems use data fusion from multiple sensors (images of different spectrum, LIDAR, RADAR and others). Pose estimation of the sensors is required for communal axes representation.

Some existing solutions match or compare objects seen by different sensors, but such comparisons are unreliable, especially if the sensors are of different types or do not have sufficient common field of view. Furthermore, the existing solutions, do not take full advantage of controlled angular shift in motion.

It is an object of present invention to provide a system and method for performing relative pose estimation of sensors, and to maintain angular shift of the sensors, when necessary. Other objects and advantages of the invention will become apparent as the description proceeds.

SUMMARY

Aspects of the present invention provide a method and system for relative pose estimation between two or more sensors, for representing sensed data from a plurality of sensors in communal axes representation, e.g., for 3D reconstruction. System and methods according to some embodiments, may include receiving, by a processor, a time frame defined by a start time t1 and an end time t2; receiving expected change in relative pose of at least two sensors, within the time frame and expected relations between angular directions of at least two of the two or more sensors, wherein the angular direction is the pitch angle and the yaw angle between the translation direction and the direction each sensor is facing at a time point; calculating, by a processor, for each sensor, from the two or more sensors, a pose shift, wherein the pose shift of each sensor is a difference in a pitch angle, a yaw angle and a roll angle, between the start time t1 and end time t2; calculating for each sensor the sensor's angular directions within the time frame, according to each sensor's axes; wherein the senor's angular shift is the change in angular directions of the sensor within the time frame, and wherein the angular direction is the Pitch angle and Yaw angle between the sensors facing direction and the translation direction of each sensor, with respect to a translation direction; comparing relations between different sensors' angular direction, at each point in time, based on the expected relations between angular directions to determine a common direction of the two or more sensors; comparing common directions of the two or more sensors between different points in time based on the expected change in relative pose; and estimating the relative pose between the two or more sensors based on the comparison.

According to some embodiments the system and method may further include representing sensed data from the two or more sensors in communal axes representation, based on the estimated relative pose between the two or more sensors. The relative pose may be estimated by a weighted fusion of estimation results in different time frames. For example, estimations made in previous time frames may be assigned weights (e.g., based on a confidence level in the estimation results) so that, for example, earlier estimations have lower weight than later estimations, and the relative pose at the end of a current time frame may be estimated by a fusion of the weighted estimations e.g., a weighted average).

The estimation of the relative pose between the two or more sensors may be performed, according to some embodiments, without direct feature matching across different sensors, and therefore may be performed even when the sensors have little to no common field of view.

According to some embodiments, the relative pose and relative translation between the sensors is further determined based on a depth map and/or a point cloud, created by the processor, based on data from at least one of the two or more sensors. The relative translation may be estimated following an estimation of the relative pose, e.g., by direct matching between the different sensors or by known physical relations between two or more of the sensors or by detecting the relative pose or relative translation between some of the sensors and parts of the vehicle. For example, in order to estimate the relative pose of sensors A and B with respect to a part of the vehicle, and based on assumptions regarding the physical connection of the sensors to the vehicle (e.g., sensor A is affixed to the right mirror, and sensor B is affixed to the left mirror of the vehicle), the location of sensors A and B in an axes system of the vehicle part (e.g., a symbol or another distinct object on the front of the vehicle) may be determined. However, the pose of sensors A and B (e.g., the Yaw angle, the Pitch angle and the Roll angle) in the same axes system is not known.

According to some embodiments, there may be for example, two ways to estimate relative pose of sensor A with respect to the vehicle part: (1) to detect part of the vehicle in sensor A's data frames (e.g., the symbol on the front of the car); (2) to assume a known relation between A's translation direction and vehicle part's translation direction. (e.g. they are identical), and knowing vehicle's part pose shift according to assistive sensors (e.g. wheel directions, gyros, vehicle computer, etc.). Similarly, the relative pose of sensor B with respect to vehicle's part may be determined and thus the relative pose of sensors A and B.

The pose estimation, according to some embodiments, may further include producing a controlled angular shift to at least one of the two or more sensors, by a sensor shift mechanism configured to produce an angular shift and move one or more of the sensors in a controlled manner. According to some embodiments, the sensor shift mechanism may be configured to produce a substantially identical shift to all of the two or more sensors. According to some embodiments, the angular shift of each of the two or more sensors, is controlled separately.

The pose estimation may be further based, according to some embodiments, on prior known relation between the two or more sensors' angular shift.

According to some embodiments, the relation between the produced shifts and movements of the two or more sensors is known. The sensors' shift mechanism may be configured to control shift of at least one of the two or more sensors based on a confidence level in estimation results. It should be appreciated that the confidence level with respect to the roll angle is affected from the size of an angular shift between a start time and end time. The term "angular shift" refers to the change in a Yaw angle and/or a Pitch angle, between the translation direction of a sensor and the sensor's facing direction within a time frame. When the angular shift is below a minimal value, the confidence level in the roll angle estimation may be low, and thus, the sensors' shift mechanism may be controlled to increase the angular shift to improve confidence level. The confidence level may also be affected by or be a function of confidence in pose shift of individual sensors, the roll estimation's confidence, the confidence in the assumed relation between individual sensor's angular direction.

It should be appreciated by those skilled in the art that as the confidence in the estimation results is higher the estimated error is lower and vice versa.

The at least two sensors may be rigidly mounted on a moving base, and may be, according to some embodiments, configured to allow mechanically and/or optically, self-induced movement.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 2 shows an example implementation of a method for pose estimation between two or more sensors, according to embodiments of the present invention;

FIGS. 7A, 7B and 7C show a graphical example of a pose shift estimation using a method according to embodiments of the present invention.

Figure 1:
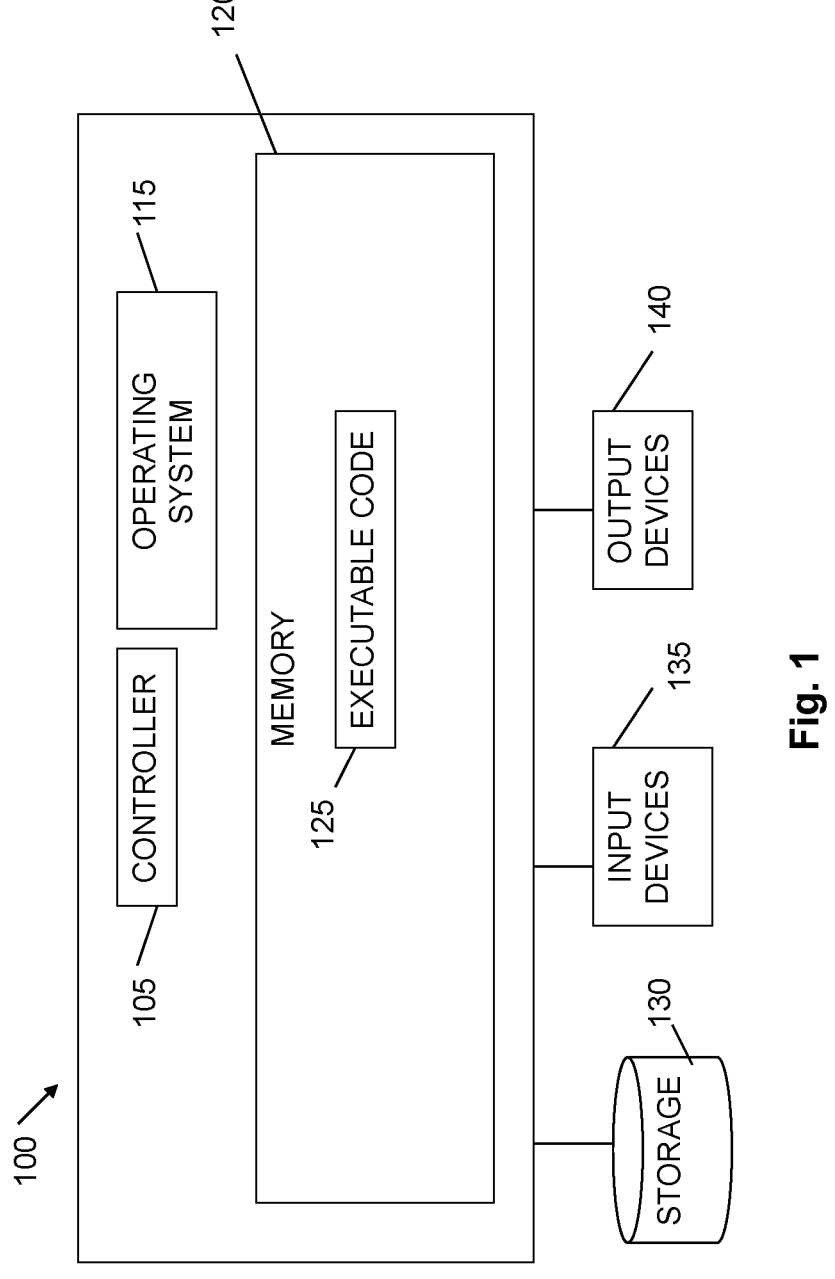
FIG. 1 shows high level block diagram of an exemplary computing device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to embodiments of the invention may provide a sensor system which estimates relative pose between its sensors (2D and 3D imaging or any other sensor, being able to estimate it's pose direction shift over time), using motion with angular shift, while avoiding the use of direct feature matching across different sensors. Furthermore, embodiments of the present invention provide a system and a method of relative pose estimation between sensors, even when there is low to no common field of view. According to some embodiments, relative translation estimation may also be provided by embodiments of the present invention.

According to some embodiments, a mechanical or optical mechanism may produce controlled angular shift to one or more sensors, which may assist pose estimation using the proposed methods. The system may be mounted on a moving base and/or use self-induced movement. The self-induced movement may be mechanical or optical.

According to embodiments of the present invention, the estimation is done by initially selecting a time frame, e.g., selecting a start time (t1) and an end time (t2) for each time frame, and computing for each sensor the pose shift within the time frame, and its angular direction to the motion translation vector. Pose shift may be defined as the Pitch, Yaw and Roll angle changes between the pose at the start of the time frame (e.g., pitch angle at t1, yaw angle at t1, and roll angle at t1) to that at the end of the time frame (e.g., pitch angle at t2, yaw angle at t2, and roll angle at t2). This step can be done with any type of imaging sensors, such as visible light cameras, IR cameras, LIDAR, RADAR, etc. The angular direction is defined as the Pitch and Yaw angles between the direction to which the sensor is facing (also defined as the sensor's facing direction) to the vector connecting the sensor's start and end position in the time frame (also referred to the translation direction), in the sensors axes.

The change in relative pose between the sensors are compared to some expected relative values, and the angular directions are likewise compared to expected values. For example, the angular directions of the sensors are compared according to some expected relation to produce common directions at different points in time, and the different common directions are compared using the expected change in relative pose during those time points. These comparisons allow a relative pose between the sensors to be estimated.

For example, a vehicle navigation system with a Quad-Sight sensor set includes two Visible Light sensitive image sensors and two Infra-Red sensitive image sensors. The sensors are connected such that the pose and translation between them is expected to stay substantially identical over a time frame, during which the vehicle is in motion along a curved path. Within this time frame a pose shift is estimated for each sensor. In addition, the angular directions of each sensor from the start to the end of the time frame is estimated. The angular directions of the sensors are expected to point to the same direction, within the time frame. Therefore, by computing the angular direction in each sensor's two axes (from two points in time), the pose shift of each sensor and the relative translation between sensors (the relative translation between sensors may refer to a vector connecting one sensor's location and another sensor's location), the sensors' relative pose may be derived. An error estimation due to the angular shift (e.g., due to low estimated or measured angular shift) in the motion may be used as input of an angular motion mechanism. For example, a vehicle navigation system moving with no angular shift over time may produce high error estimations in the pose estimation. It will then operate a mechanical mechanism to shift the sensors in a controlled manner. Pose estimations with this method may pick time points where it is known the mechanism has created some angular shift between them, and it may iterate the process with multiple pairs of time points.

Reference is made to FIG. 1, showing a high-level block diagram of an exemplary computing device according to embodiments of the present invention. Computing device 100 may include a controller 105 that may be, for example, a central processing unit processor (CPU), a chip or any suitable computing or computational device, an operating system 115, a memory 120, an executable code 125, a storage 130, input devices 135 and output devices 140. Controller 105 may be configured to carry out methods described herein, and/or to execute or act as the various modules, units, etc. More than one computing device 100 may be included, and one or more computing devices 100 may act as the various components. For example, the sensor system described herein may be, or may include components of, computing device 100. For example, by executing executable code 125 stored in memory 120, controller 105 may be configured to carry out a method of FIGS. 2-5 as described herein. For example, controller 105 may be configured to receive a start time and an end time of a time frame, receive sensor data from the start time and the end time from at least two sensors, calculate a pose shift, calculate the angular direction and use these calculated values to estimate a relative pose of the at least two sensors as described herein.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that estimates relative pose of two or more sensors as further described herein. Although, for the sake of clarity, a single item of executable code 125 is shown in FIG. 1, a system according to embodiments of the invention may include a plurality of executable code segments similar to executable code 125 that may be loaded into memory 120 and cause controller 105 to carry out methods described herein. For example, units or modules described herein (e.g., sensors system and sensors' shift mechanism) may be, or may include, controller 105 and executable code 125.

Storage 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120. Storage 130 may store data used during pose estimation, such as, for example, past estimation (e.g., estimation relating to previous time frames), calculated error values, sensed data from one or more sensors, etc.

Input devices 135 may be or may include different types of sensors, such as imagers (e.g., visible light imagers and/or Infra-red imagers), LiDAR, RADAR, gyroscopes, or any suitable input device. In some embodiments, input device 135 may be a sensor shift mechanism, such as the mechanism described with reference to FIGS. 6A and/or 6B. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105.

Some embodiments may be provided in a computer program product that may include a non-transitory machine-readable medium, stored thereon instructions, which may be used to program a computer, controller, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPU) or any other suitable multipurpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Reference is now made to FIG. 2 that shows a method for relative pose estimation between two or more sensors according to embodiments of the present invention. In step 200 two or more points in time t1, t2, . . . tn, may be selected, and one or more time frames may be set by selecting a time frame start point (e.g., ts) and a time frame end point (e.g., te). It should be appreciated that a time frame may be defined by two consecutive points in time, or by any other selection of points in time. For example, a first time frame f1 may be defined by a start time t1 and an end time t2, and a second time frame f2 may be defined, for example, by a start time t5 and an end time t11. It should be further appreciated that two or more time frames may partially overlap. For example, time frame f1 may start at t1 and end at t3 and time frame f2 may start at t2 and end at t6. In another non-limiting example, a first time frame f1 may be defined by t1 and t2, while another time frame f3 may be defined by t1 and t3, by t2 and t3 or by t2 and t5.

In step 202, data from two or more sensors may be collected wherein the data is correlated with the points in time in which the data was pulled from the sensors. The collected data may include: images from cameras, laser measurements from Lidar, Radar inputs, data from assistive sensors such as gyroscopes, vehicle related data, such as vehicle wheels data etc.

According to some embodiments, in step 204 expected changes in relative pose of at least two of the two or more sensors values within the time frame are determined, as well as expected relation between angular directions of at least two of the two or more sensors, within the time frame. That is, the processor may determine, according to some embodiments, the expected change in relative pose and expected relation between angular directions of each sensor within a time frame.

The expected values may be determined by the physical design of the sensor system or by other assistive sensors (e.g. gyroscope or the like). For example, in a very solid sensor system it may be assumed that the relative pose does not change in a short time frame, and that the relation between angular directions for different sensors are nearly identical.

At step 206, for each sensor a pose shift and sensor's angular directions during one or more time frames may be calculated. The pose shift calculation may include comparing one or more of: a Pitch angle, a Yaw angle and a Roll angle at the end of the time frame to the corresponding Pitch angle, Yaw angle and/or Roll angle at the beginning thereof. For example, the rotation of a LiDAR changed between t1 and t2 (e.g., a sensor shifting to its right between t1 and t2 being a positive Yaw angle change for that time frame).

Similarly, estimating a change in a sensor's angular direction between t2 and t1 (e.g., the angular shift of the sensor between t1 and t2), may include estimating the Pitch angle and Yaw angle of each sensor with respect to a vector connecting the location of the sensors at t1 and the location of the sensors at t2.

According to some embodiments, the estimated values of pose shift and angular direction may be determined by matching features between sensed data received from at least one sensor, at two or more points in time. For example, matching features extracted from an image obtained by camera A at t1 to the same features extracted from images obtained from camera A at one or more of times t2, t3, t4, tn, and estimating pose shifts and angular shift for camera A within the time frame that would minimize a measured reprojection error.

At step 208, the relations between different sensors' angular directions at each point in time, may be compared, based on the expected relations (determined at step 204) to determine a common direction of sensors. The comparison at step 208 may refer to the relations between each sensor's angular shift to the sensor's expected angular shift in a plurality of points in time.

At step 210, common directions of the two or more sensors between different points in time may be compared, based on the expected change in relative pose. The comparison of steps 208 and 210, may result in an estimated relative pose between two or more of the at least two sensors (step 212).

According to embodiments of the present invention, during motion with angular shift (e.g., motion of the moving platform that is not along a straight line, or an arced trajectory), one or more of the sensors gather data, which may be saved for future computations. A pose estimation is made by selecting two time points t1 and t2 where the expected values of step 204 are known or otherwise estimate-able (e.g., from assistive sensors such as gyroscopes or from other sources).

The sensor pose at t1 may be estimated as described above, the one at t2 may be similarly estimated.

According to some embodiments, a computation reliability or confidence may be measured by an error estimation, for which a low angular motion value is a contributor. It should be appreciated that the confidence level with respect to the roll angle is affected from the size of an angular shift between a start time and end time. When the angular shift is below a minimal value, the confidence level in the roll angle estimation may be low.

This error estimation (or confidence level estimation) may be used as input to a function in an angular motion mechanism. Alternatively, it may be used as a weight indicator for multiple computations with different points in time.

The confidence level may also be affected by or be a function of confidence in pose shift of individual sensors, the roll estimation's confidence, the confidence in the assumed relation between individual sensor's angular direction.

It should be appreciated by those skilled in the art that as the confidence level in the estimation results is higher the error estimation is lower and vice versa.

While the method described above with reference to FIG. 2 described two (or more) sensors. The process is nearly identical when implemented to multiple sensors. When the relative pose of multiple sensors is estimated, instead of estimating the relative pose between two sensors, a relation between multiple of them is estimated. For example, running the process of FIG. 2, with 3 sensors A, B and C, would be performed first for sensors A and B and then on sensors A and C). In another example, having N sensors, running the process on a first pair of sensors (e.g., A and B) and then with any other combination of pairs of sensors (e.g., A and C, B and C, A and D, B and D, C and D, . . . , A and N, B and N, N−1 and N). In a third example, the method may be implemented with a first pair of sensors (e.g., A and B) and then with additional pairs wherein each additional pair includes one sensor that was previously paired to another sensor (e.g., B and C). Data correlating to points t1 and t2 may be collected from all sensors (e.g., 2, 3, 4, . . . , n sensors) as shown in steps 200 and 202. Expected values are also determined to the expected changes in relative pose and relation between angular directions of each sensor (step 204). In step 206, for each sensor, a pose shift is calculated between the time points (Pitch, Yaw and Roll angles), as well as an angular shift between t2 and t1 (Pitch and Yaw angles). The results are compared with the relative values that are expected between them (steps 208 and 210), and a relative pose estimation between all sensors can be derived (step 212).

According to some embodiments, during motion with angular shift some or all sensors may gather data, which may be saved (e.g., in storage 130 in FIG. 1) for future computations. A relative pose estimation is made by selecting two (or more) time points t1 and t2 where expected change in relative pose and expected relation between angular directions of each sensor within the selected time frames are known. The sensor relative poses at t1 may be estimated as described in FIG. 2 above and therefore the ones at t2 may be derived.

According to some embodiments, a relative translation may be estimated as well. The relative translation may be estimated following an estimation of the relative pose, e.g., by direct matching between the different sensors or by known physical relations between two or more of the sensors or by detecting the relative pose or relative translation between some of the sensors and parts of the vehicle. For example, in order to estimate the relative pose of sensors A and B with respect to a part of the vehicle, and based on assumptions regarding the physical connection of the sensors to the vehicle (e.g., sensor A is affixed to the right mirror, and sensor B is affixed to the left mirror of the vehicle), the location of sensors A and B in an axes system of the vehicle part (e.g., a symbol on the front of the vehicle) may be determined. However, the pose of sensors A and B (e.g., the Yaw angle, the Pitch angle and the Roll angle) in the same axes system is not known.

According to some embodiments, there may be for example, two ways to estimate relative pose of sensor A with respect to the vehicle part: (1) to detect part of the vehicle in sensor A's data frames. e.g. the symbol on the front of the car; (2) to assume a known relation between A's translation direction and vehicle part's translation direction. (e.g., they are identical) and knowing vehicle's part pose shift according to assistive sensors (e.g., wheel directions, gyros, vehicle computer, etc.). Similarly, the relative pose of sensor B with respect to vehicle's part may be determined and thus the relative pose of sensors A and B.

Figure 3:
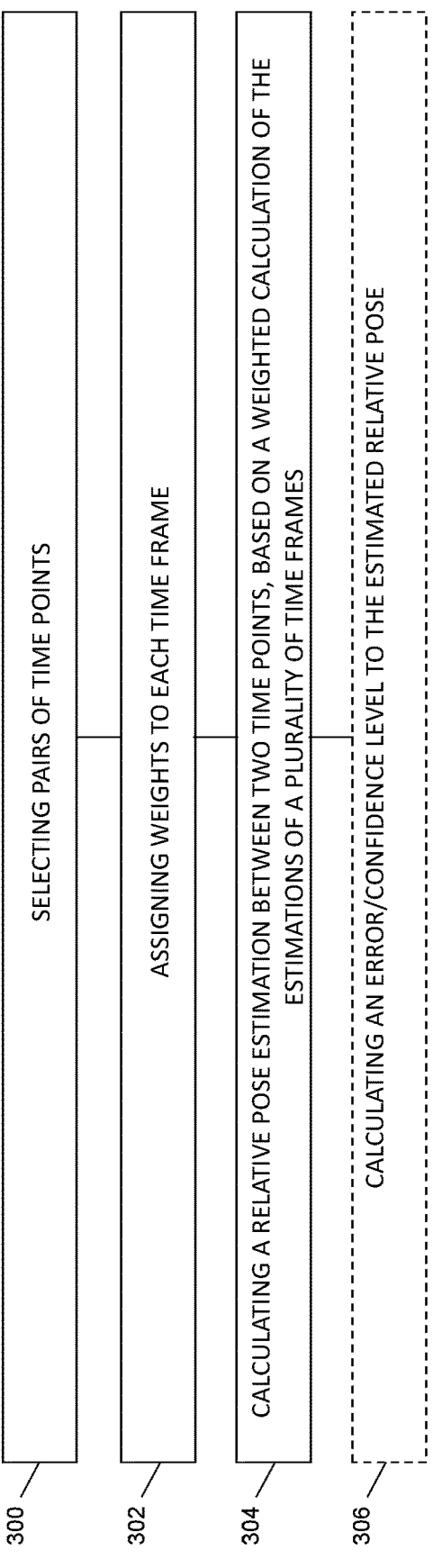
FIG. 3 shows an example implementation of the proposed pose estimation by multiple weighted computations, according to embodiments of the present invention.

Reference is now made to FIG. 3 which shows an example implementation of the proposed pose estimation by multiple weighted computations (or weighted fusion) according to some embodiments.

In step 300, pairs of time points are selected, each of the pairs of time points define a time frame. In step 302, weight value is given to each time frame. The weights may be assigned to time frames based on the expected accuracy (e.g., confidence level) of the pose estimated using these time points. The weights may be assigned based on an assumption regarding the stability of the system. For example, as the assumed stability of the system is lower, a lower confidence level may be given to earlier estimates with respect to later estimates (e.g., estimates pertaining to time frames with a later start and/or end points). As the confidence level is lower, a lower weight may be assigned to the estimate.

Pose estimation confidence may refer to the combination of (1) pose estimation without roll confidence and (2) roll estimation confidence. The pose estimation without roll confidence is affected negatively by low confidence of expected relation between translations of two or more sensors and low confidence in pose shift and angular direction estimation. The roll estimation confidence is affected negatively by low angular shift and low confidence in expected change in relative pose. The roll estimation confidence is also negatively affected by low pose estimation without roll confidence.

For example, the same relative pose, may be estimated several times, each time by using a different time frame. According to some embodiments, a weight of 1 may be assigned to the estimate with the highest confidence (least expected error) while the other estimates for other time frames may be assigned a weight of 0.

Another example, take all the results and do a weighted average with "confidence" as the weight.

According to some embodiments, the pose estimation confidence level may be determined by the combination of the pose estimation without roll confidence and the roll estimation confidence in the time frame. e.g., in a selected time frame, when a low angular motion of the sensors (meaning the sensor set didn't turn sharply enough between t1 and t2) is estimated—the confidence level may be low and the processor may assign a low weight to the output at that specific time frame. Specifically, the Roll angle around the translation vector may be marked unreliable, and a low weight may be assigned.

In step 304 a plurality of pairs (or time frames) may be used for pose estimation, while each pair receives a weight and then calculated together in a weighted fashion to produce a single relative pose estimation. For example, a weighted average may be calculated to estimate the relative pose between two or more sensors.

According to some embodiments, an optional step 306 may include calculating an error or confidence level for the estimated relative pose. The error or confidence level may be determined by the angular shift between t1 and t2. The error estimation, or confidence level estimation may be done separately for each sensor.

Figure 4:
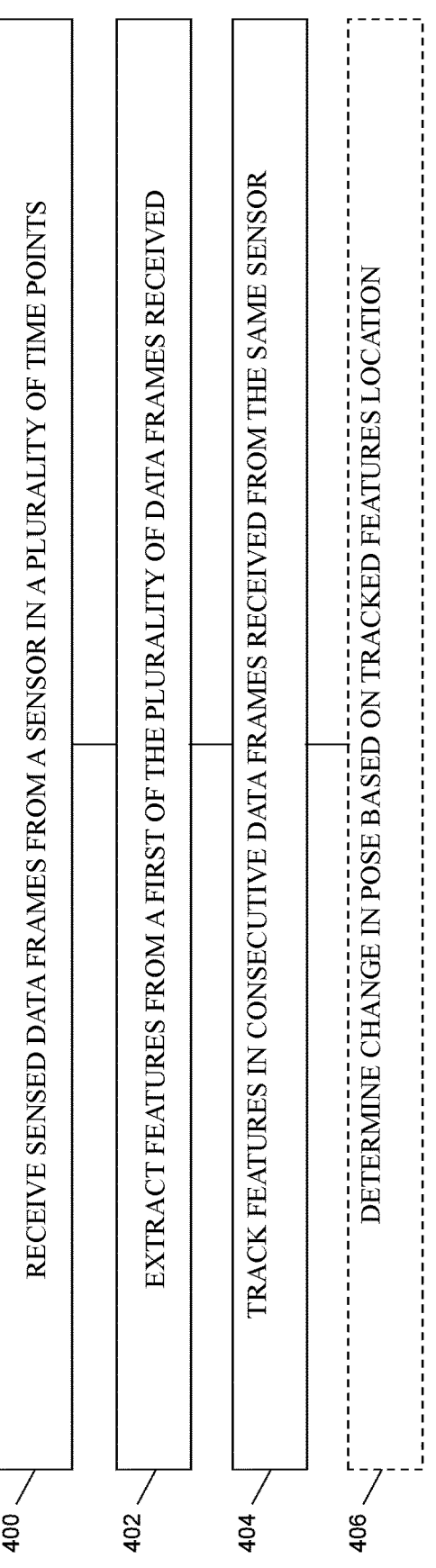
FIG. 4 shows an example implementation of the proposed method while tracking features over time, according to some embodiments.

FIG. 4 shows an example implementation of a method of determining a pose shift of a sensor over time by tracking features in consecutive sensed data received from the sensor over time.

In step 400, sensed data frames may be received from a sensor in a plurality of time points. For example, a visible light image sensor may provide to a processor, such as processor 105 in FIG. 1, a first image at time t1 and a second image at time t2. Additional images may be provided by the sensor in additional time points (e.g., t3, t4 etc.).

In step 402, features may be extracted by the processor from one of the plurality of data frames received, and in step 404, the extracted features may be tracked in consecutive and/or previous data frames received from the same sensor. For example, by using algorithms for tracking over time, such as fitting the extracted features to paths or Kalman Filter.

In step 406, the location of the feature in each of a plurality of frames, may be used to determine or to refine the change in pose. For example, a single object in the real world can be tracked across various images of a single sensor. e.g. tracking a building corner along N frames of a camera. By tracking it over N frames a better estimation of the object's location in every single frame, may be obtained, and inaccuracies may be removed or corrected. For example, if an object's location on the x axis of the sensor is [1,1,1,33,1,1,1] then it may be assumed that 33 is an error and should be corrected to 1 or removed from consideration. Furthermore, a constant change in position of the object in consecutive frames, may indicate a pose shift. For example, if the object's location on the X axis of the sensor is [1, 1, 1, 2, 2, 3 3], then it may be assumed that the sensor's pose has changed after the third frame.

In some embodiments, features may be extracted from obtained frames, and then the time points may be selected, e.g., selecting the time frame with the most tracked features.

Figure 5:
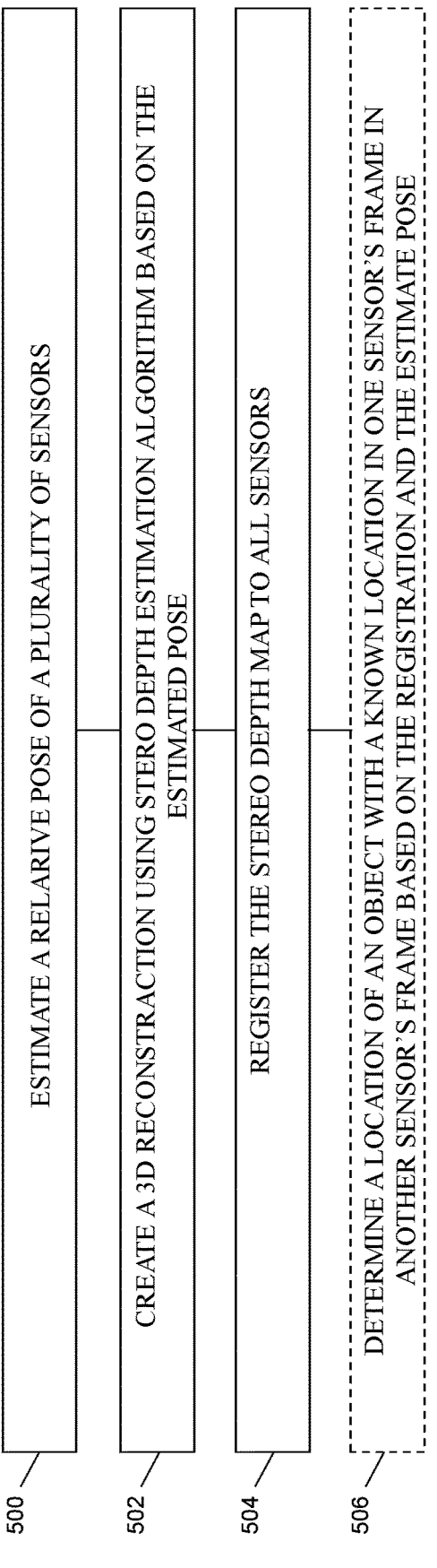
FIG. 5 shows an example implementation of the proposed method to register stereo depth estimations to another sensor, according to some embodiments.

FIG. 5 shows an example implementation of a method according to embodiments of the present invention, to register stereo-depth estimations between sensors of the sensor system.

According to some embodiments, in step 500 a relative pose and relative translation are estimated between a plurality of sensors, e.g., sensors A, B and C. The translation may be assumed to stay stable between A, B and C or may be estimated as described above. which allows relative pose and relative translation between all sensors.

In step 502, estimated relative pose and relative translation of two of the plurality of sensors (e.g., sensors A and B) are used for 3D reconstruction using a stereo depth estimation algorithm.

In step 504 a registration is then made between the two sensors, and all other sensors to register the stereo depth map to all sensors.

In step 506, an object detected in a first frame of a first sensor (e.g. sensor A) may be detected in a corresponding frame (e.g., obtained at the same time) of another sensor (e.g., sensor C) based on the known relative pose, relative translation and the registration. It should be appreciated that this may be done between sensors of different type, e.g., between imagers and a LiDAR or a RADAR.

It should be further appreciated that when a single sensor can provide a depth map, the above method may be performed using two or more sensors.

Figure 6A:
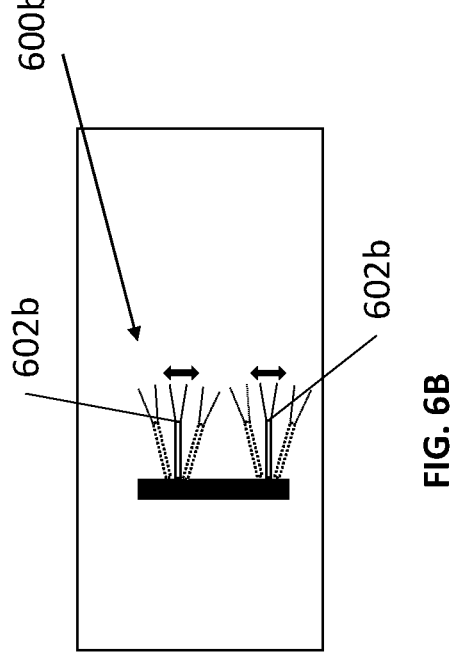
FIGS. 6A and 6B show examples of a sensors' shift mechanisms according to embodiments of the present invention.
Figure 6B:
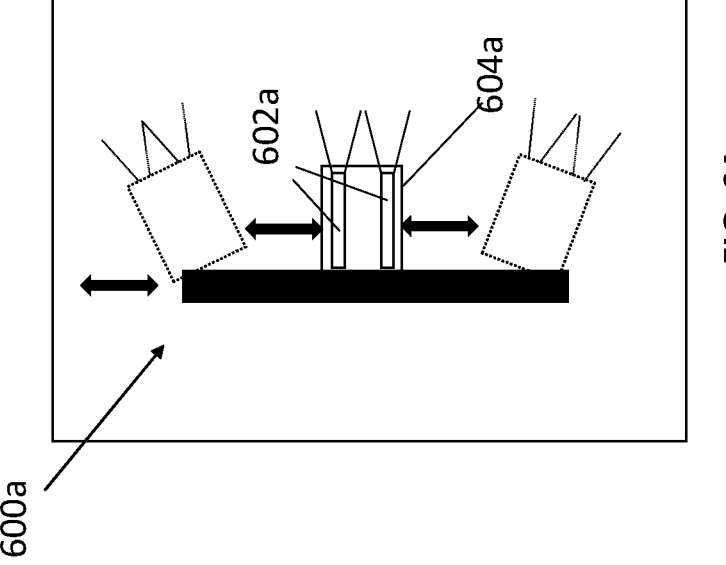

FIGS. 6A and 6B show examples of sensor's shift mechanisms 600a, 600b used to create angular motion. Mechanism 600a may have a single controlled angular shift mechanism applied to multiple sensors 602a, while mechanism 600b shows different controlled angular shifts applied to each sensor 602b individually. It should be appreciated to those skilled in the art, that the mechanism of FIG. 600B may be or may include, several mechanisms 600a, each associated with a single sensor 602b. Mechanism 600a, 600b may be or may include one or more controlled motors, a controller to control operation of the one or more motors, rails, pistons and other elements known in the art to control the angular shift of one or more sensors.

According to some embodiments, sensors 602a are housed in a housing 604a, which is configured to be shifted by mechanism 600a as illustrated by the arrows directions. Dashed lines housing represent the position of housing 604a and the sensors 602a after shift.

With reference to FIG. 6B, each of sensors 602b may be controlled shifted separately and in different directions as illustrated by the arrows in FIG. 6B.

Reference is now made to FIGS. 7A, 7B and 7C showing a graphical representation of a pose shift estimation according to embodiments of the present invention. FIG. 7A shows a Birdseye view of a vehicle 700 on a curving path 702. As seen in FIG. 7A, mounted on vehicle 700 is a system with sensors 704a and 704b. As the vehicle reaches point 702b data gathered at that point and at a previous point 702a along path 702, may be used by a processor of a sensor system including sensors 704a and 704b, for a pose estimation. Point 702a may be chosen by some constant distance traveled before point 702b, and/or based on a time passing during travel from point 702a to point 702b.

With reference to FIG. 7B sensors 704a and 704b are illustrated at point 702a and at point 702b. 706a and 708a are the Focus of Expansion (FOE) points computed by the translation between the two images from sensor 704a, (also shown respectively in FIG. 7C). Similarly, 707a and 707b are the FOE points computed by the translation of sensor 704b, (also shown in FIG. 7C). The FOE point locations may be estimated, according to some embodiments, along with the pose shift and angular direction of each sensor, e.g., by using optical flow algorithms to match features between the two images of each sensor and a bundle adjustment algorithm. The FOE location in a sensor's image points to the sensor's angular direction at the time point of the image.

FIG. 7C, illustrates a method to derive the relative pose between sensors 704*a* and 704*b*. The sensors may be assumed to have stable relative pose between them and are also assumed a near identical translation direction between the two points in time. Therefore, the translation direction at any time point can be considered a common direction.

This may be done by matching the FOE locations on the sensed data frames collected at location 702*a* and the FOE locations on the sensed data frames collected at location 702*b* (in FIG. 7A). 706*a* and 707*a* are the frames taken respectively by sensor 704*a* and sensor 704*b* at point 702*a*. Similarly, 706*b* and 707*b* are the frames taken respectively at point 702*b*. By matching both of the common directions defined by the FOE locations (710*a* and 710*b*) it is shown Pitch and Yaw angles, that define a common direction can be estimated, but not the Roll angle around it. At step 710*c* a single relative pose estimation (Pitch, Yaw and Roll) will match the FOE locations from both 710*a* and 710*b* and therefore match both common directions. This relative pose is the deducted relative pose between sensors 704*a* and 704*b*.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of performing real-time data fusion between two or more image sensors for 3D reconstruction, by at least one processor, the method comprising:

receiving a time frame defined by a start time point and an end time point;

receiving real-time sensor data from the two or more sensors mounted on a moving platform, said real time sensor data comprising a plurality of sensed data frames;

applying, to the plurality of sensed data frames, an optical flow algorithm to calculate, for each sensor of the two or more sensors, a Focus Of Expansion (FOE) point location in sensed data frames corresponding to the start time point and the end time point, said FOE point location representing an angular direction of a respective sensor relative to a translation direction of the moving platform, at the start time point and the end time point, respectively;

determining the translation direction at the start time point and at the end time point, by matching the FOE point location between the sensed data frames of said two or more sensors, at the start time point and the end time point, respectively;

estimating a relative pose between the two or more sensors, by defining relative pitch, yaw and roll angles between the two or more sensors such that simultaneously provide matching FOE point locations for determined translation directions across the sensed data frames of the start time point and the end time point;

representing said real-time sensor data from the two or more sensors in a communal axes representation, based on the estimated relative pose; and performing fusion of said real-time sensor data between said two or more sensors for the 3D reconstruction, using the communal axes representation.

2. The method according to claim 1, wherein the relative pose is estimated by weighted fusion of estimation results in different time frames.

3. The method according to claim 1, wherein the estimation of the relative pose between the two or more sensors is performed without direct feature matching across said two or more sensors.

4. The method according to claim 1, wherein the relative pose is further determined based on a depth map created by the processor, based on said real-time sensor data from at least one of the two or more sensors.

5. The method according to claim 1, wherein the estimation of the relative pose further comprises producing a controlled angular shift to at least one of the two or more sensors, by a sensor shift mechanism.

6. The method according to claim 5, wherein the estimation of the relative pose is further based on prior known relation between the two or more sensors' angular shift.

7. The method according to claim 5, wherein the sensor shift mechanism is configured to produce a substantially identical shift to all of the two or more sensors.

8. The method according to claim 5, wherein the angular shift of each of the two or more sensors is controlled separately.

9. The method according to claim 5, wherein the relation between the produced controlled angular shifts of the two or more sensors is known.

10. The method according to claim 5, wherein the sensor shift mechanism is configured to control shift of at least one of the two or more sensors based on a confidence level in estimation of the relative pose.

11. The method according to claim 10, wherein the confidence level is a roll estimation confidence level determined based on the angular shift size, of at least one of the two or more sensors, between the start time point and the end time point.

12. The method according to claim 5, wherein the controlled angular shift is mechanical or optical.

13. The method according to claim 5, wherein at least one of the two or more sensors comprise one or more assistive sensors configured to monitor shifts in the at least one sensor pose, said assistive sensors selected from a list consisting of: gyroscopes, wheel direction sensors, speedometers, and imagers configured to image one or more of the at least two sensors.

14. The method according to claim 1, wherein the two or more sensors have no common field of view.

15. The method according to claim 1, wherein the two or more sensors comprise different types of sensors, selected from a list consisting of: visible light imagers, Infra-red imagers, LiDAR sensors, and RADAR sensors.

16. A system for performing real-time data fusion between two or more sensors for 3D reconstruction, the system comprising:

two or more sensors, mounted on a movable platform;

a non-transitory memory device, wherein modules of instruction code are stored; and a processor, associated with the memory device, and configured to execute the modules of instruction code, whereupon execution of said modules of instruction code, the at least one processor is configured to:

receive a time frame defined by a start time point and an end time point;

receive real-time sensor data from the two or more sensors, said real-time sensor data comprising a plurality of sensed data frames;

apply, to the plurality of sensed data frames, an optical flow algorithm to calculate, for each sensor of the two or more sensors, a Focus Of Expansion (FOE) point location in sensed data frames corresponding to the start time point and the end time point, said FOE point location representing an angular direction of a respective sensors relative to a translation direction of the moving platform, at the start time point and the end time point, respectively;

determine the translation direction at the start time point and at the end time point, by matching the FOE point location between the sensed data frames of said two or more sensors, at the start time point and the end time point, respectively;

estimate a relative pose between the two or more sensors, by defining relative pitch, yaw and roll angles between the two or more sensors such that simultaneously provide matching FOE point locations for determined translation directions across the sensed data frames of the start time point and the end time point;

represent said real-time sensor data from the two or more sensors in a communal axes representation, based on the estimated relative pose; and perform fusion of said real-time sensor data between said two or more sensors for the 3D reconstruction, using the communal axes representation.

17. The system according to claim 16, wherein the two or more sensors comprise different types of sensors, selected from a list consisting of: visible light imagers, Infra-red imagers, LiDAR sensors, and RADAR sensors.

* * * * *